US010323862B2

(12) United States Patent
Okano (10) Patent No.: US 10,323,862 B2
(45) Date of Patent: Jun. 18, 2019

(54) AIR CONDITIONING UNIT HAVING DYNAMIC TARGET CONDENSING AND EVAPORATING VALUES BASED ON LOAD REQUIREMENTS

(71) Applicant: Hiroyuki Okano, Tokyo (JP)

(72) Inventor: Hiroyuki Okano, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 552 days.

(21) Appl. No.: 14/443,429

(22) PCT Filed: Dec. 28, 2012

(86) PCT No.: PCT/JP2012/084125
§ 371 (c)(1),
(2) Date: May 18, 2015

(87) PCT Pub. No.: WO2014/103028
PCT Pub. Date: Jul. 3, 2014

(65) Prior Publication Data
US 2015/0292777 A1    Oct. 15, 2015

(51) Int. Cl.
*F25B 13/00*    (2006.01)
*F25B 5/02*    (2006.01)
(Continued)

(52) U.S. Cl.
CPC .............. *F25B 5/02* (2013.01); *F24F 11/77* (2018.01); *F25B 49/02* (2013.01); *F24F 11/85* (2018.01);
(Continued)

(58) Field of Classification Search
CPC ........ F25B 2313/023; F25B 2313/0231; F25B 2313/0233; F25B 2313/0253;
(Continued)

(56) References Cited

U.S. PATENT DOCUMENTS 4,481,788 A * 11/1984 Yoshino .................. F24D 17/02
236/91 C
5,142,879 A * 9/1992 Nakamura .............. F24F 3/065
62/160

(Continued)

FOREIGN PATENT DOCUMENTS

CN    102112826 A    6/2011
GB        849158 A *  9/1960   .............. F25B 40/00
(Continued)

OTHER PUBLICATIONS

Extended European Search Report dated Sep. 23, 2016 issued in corresponding EP patent application No. 12891184.9.
(Continued)

*Primary Examiner* — Edward F Landrum
*Assistant Examiner* — Daniel C Comings
(74) *Attorney, Agent, or Firm* — Posz Law Group, PLC (57) ABSTRACT

A target condensing temperature and a target evaporating temperature are changed in accordance with a load of each load side unit obtained by using load detection means, and an operating frequency of a compressor and a rotation speed of a fan are controlled such that a condensing temperature obtained by using temperature detection means coincides with the target condensing temperature and an evaporating temperature obtained by using the temperature detection means coincides with the target evaporating temperature.

18 Claims, 3 Drawing Sheets

(51) Int. Cl.
*F25B 49/02* (2006.01)
*F24F 11/77* (2018.01)
*F24F 11/85* (2018.01)

(52) U.S. Cl.
CPC ......... *F25B 13/00* (2013.01); *F25B 2313/023* (2013.01); *F25B 2313/025* (2013.01); *F25B 2313/0231* (2013.01); *F25B 2313/0233* (2013.01); *F25B 2313/0253* (2013.01); *F25B 2313/0272* (2013.01); *F25B 2313/0293* (2013.01); *F25B 2313/0294* (2013.01); *F25B 2313/02531* (2013.01); *F25B 2313/02533* (2013.01); *F25B 2313/02741* (2013.01); *F25B 2313/0314* (2013.01); *F25B 2400/13* (2013.01); *F25B 2400/23* (2013.01); *F25B 2600/025* (2013.01); *F25B 2600/0253* (2013.01); *F25B 2600/111* (2013.01); *F25B 2600/112* (2013.01); *F25B 2600/19* (2013.01); *F25B 2600/21* (2013.01); *F25B 2700/1931* (2013.01); *F25B 2700/1933* (2013.01); *F25B 2700/2104* (2013.01); *F25B 2700/2116* (2013.01); *F25B 2700/2117* (2013.01); *Y02B 30/741* (2013.01)

(58) Field of Classification Search
CPC .. F25B 2313/02531; F25B 2313/02533; F25B 2313/314; F25B 2313/315; F25B 2600/02; F25B 2600/025; F25B 2600/0253; F25B 2600/11; F25B 2600/111; F25B 2600/112; F25B 2600/2507; F25B 2600/2511; F25B 2600/2519; F25B 2700/2101; F25B 2700/2104; F25B 2700/2116; F25B 2700/2117
See application file for complete search history.

(56) References Cited

U.S. PATENT DOCUMENTS

| | | | |
|---|---|---|---|
| 6,119,473 A * | 9/2000 | Kishita | B60H 1/3208 62/133 |
| 6,845,629 B1 * | 1/2005 | Bourne | F28C 3/08 165/166 |
| 2008/0245083 A1 | 10/2008 | Tutunoglu et al. | |
| 2011/0192184 A1 * | 8/2011 | Yamashita | F24F 1/02 62/196.1 |
| 2012/0285675 A1 | 11/2012 | Shinozaki | |

FOREIGN PATENT DOCUMENTS

| | | |
|---|---|---|
| JP | 2003-207191 A | 7/2003 |
| JP | 2008-215678 A | 9/2008 |
| JP | 2011-112233 A | 6/2011 |
| JP | 2012-097910 A | 5/2012 |
| JP | 2012-107840 A | 6/2012 |

OTHER PUBLICATIONS

Office Action dated Nov. 28, 2016 issued in corresponding CN patent application No. 201280077495.7.
Office Action dated Jul. 20, 2017 issued in corresponding CN patent application No. 201280077495.7 (and English translation).
International Search Report of the International Searching Authority dated Mar. 26, 2013 for the corresponding international application No. PCT/JP2012/084125 (and English translation).
Office Action dated May 10, 2016 in the corresponding JP application No. 2014-554017 (with English translation).

\* cited by examiner

AIR CONDITIONING UNIT HAVING DYNAMIC TARGET CONDENSING AND EVAPORATING VALUES BASED ON LOAD REQUIREMENTS

CROSS REFERENCE TO RELATED APPLICATION

This application is a U.S. national stage application of International Application No. PCT/JP2012/084125 filed on Dec. 28, 2012, the disclosure of which is incorporated by reference.

TECHNICAL FIELD

The present invention relates to a multi-type air-conditioning apparatus which enables an operation (hereinafter, referred to as a cooling/heating mixed operation) in which each of a plurality of indoor units (load side units) performs a cooling operation or a heating operation, and particularly relates to a control method which reduces power consumption.

BACKGROUND ART

Hitherto, there is an air-conditioning apparatus which makes an evaporating temperature and a condensing temperature, which are control target temperatures in a refrigeration cycle, variable in accordance with a load (see Patent Literature 1). The air-conditioning apparatus performs an operation with a low compression ratio at the time of low load by making an evaporating temperature and a condensing temperature, which are control target temperatures, to be variable values in accordance with an air-conditioning load estimated based on an operation mode and the difference between a set temperature and a suction temperature, thereby reducing power consumption.

In addition, because of a multi-type, a plurality of indoor units operate under respective load conditions at the same time, and the method is a method in which a condensing temperature and an evaporating temperature of refrigerant are controlled to constant values, not a method in which a blowout temperature of refrigerant is controlled for individual indoor units.

In this method, the difference between the suction temperature and the set temperature is monitored. When "suction temperature−set temperature" becomes equal to or less than a predetermined value, it is determined that the air-conditioning load is low. If the operation is a cooling operation, by increasing the evaporating temperature which is a control target, it is possible to decrease the frequency of a compressor to reduce power consumption. In addition, if the operation is a heating operation, by decreasing the condensing temperature which is a control target, it is possible to decrease the frequency to reduce power consumption.

CITATION LIST

Patent Literature

Patent Literature 1: Japanese Unexamined Patent Application Publication No. 2012-107840 (e.g., see [0014] to [0069] and FIGS. 1 to 10)

SUMMARY OF INVENTION

Technical Problem

However, when, as in the multi-type air-conditioning apparatus described in Patent Literature 1 which enables a cooling/heating mixed operation, the capacity of a heat source side heat exchanger is controlled in accordance with the load such that the evaporating temperature and the condensing temperature coincide with a target evaporating temperature and a target condensing temperature, if one of these temperatures is controlled, the effect is not sufficient.

In addition, there is the following problem. When an operation is performed in a state where the rotation speed of a fan at each of a condenser and an evaporator is high in order to perform control in accordance with the control target condensing temperature and evaporating temperature, the power consumption of each fan relatively increases as compared to the power consumption of a compressor. As a result, an energy-saving effect is reduced.

The present invention has been made in order to solve the above-described problems, and an object of the present invention is to provide a multi-type air-conditioning apparatus which enables a cooling/heating mixed operation and controls both an evaporating temperature and a condensing temperature to increase an energy-saving effect.

Solution to Problem

An air-conditioning apparatus according to the present invention includes: a heat source side unit including a compressor and an outdoor heat exchanger connected in series by piping, the outdoor heat exchanger including a fan, the heat source side unit being configured to supply heat via refrigerant; a plurality of load side units each including an indoor heat exchanger and an indoor expansion device connected in series by piping, each of the load side units being supplied with the heat from the heat source side unit via the refrigerant; and a refrigerant control unit configured to switch a flow of the refrigerant in accordance with an operating state. The heat source side unit and the refrigerant control unit are connected in series by piping, the refrigerant control unit and each load side unit are connected in series by piping, and the load side units are connected in parallel by piping. Each load side unit performs a cooling operation or a heating operation. The heat source side unit includes temperature detection means used for obtaining a condensing temperature and an evaporating temperature of the refrigerant. Each load side unit includes load detection means used for obtaining a load during operation. A target condensing temperature and a target evaporating temperature of the refrigerant are changed in accordance with the load of each load side unit obtained by using the load detection means. An operating frequency of the compressor and a rotation speed of the fan are controlled such that the condensing temperature obtained by using the temperature detection means coincides with the target condensing temperature and the evaporating temperature obtained by using the temperature detection means coincides with the target evaporating temperature.

Advantageous Effects of Invention

With the air-conditioning apparatus according to the present invention, it is possible to increase an energy-saving effect by controlling both the evaporating temperature and the condensing temperature.

DESCRIPTION OF EMBODIMENTS

Hereinafter, Embodiment of the present invention will be described with reference to the drawings.

Embodiment

Figure 1:
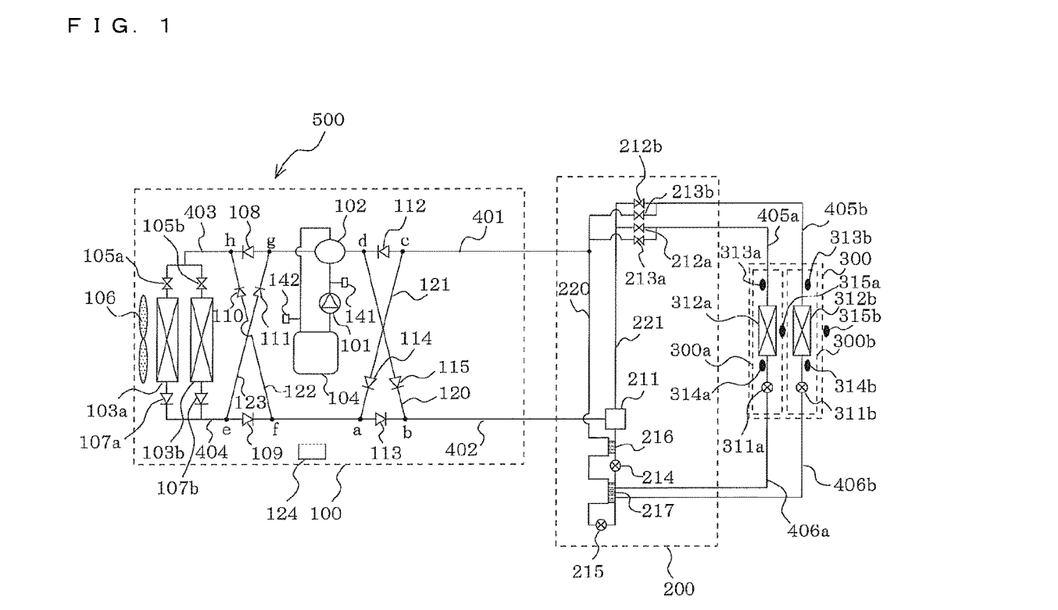
FIG. 1 is a schematic configuration diagram showing an example of a refrigerant circuit configuration of an air-conditioning apparatus according to Embodiment of the present invention.

FIG. 1 is a schematic configuration diagram showing an example of a refrigerant circuit configuration of an air-conditioning apparatus 500 according to Embodiment of the present invention. The refrigerant circuit configuration of the air-conditioning apparatus 500 will be described with reference to FIG. 1. It should be noted that the relationship of the size of each constituent element in the drawings described below including FIG. 1 may be different from actual size.

The air-conditioning apparatus 500 is installed in a building, a condominium, or the like and is able to perform a cooling/heating mixed operation by utilizing a refrigeration cycle (heat pump cycle) which circulates refrigerant. The air-conditioning apparatus 500 includes a heat source side unit 100, a refrigerant control unit 200, and a plurality of (two in FIG. 1) load side units 300 (300a and 300b).

In addition, the heat source side unit 100 and the refrigerant control unit 200 are connected to each other by a low-pressure pipe 401 and a high-pressure pipe 402, and the refrigerant control unit 200 and the load side units 300 are connected to each other by gas pipes 405a and 405b and liquid pipes 406a and 406b, to form the refrigeration cycle.

[Heat Source Side Unit 100]

The heat source side unit 100 has a function to supply cooling energy or heating energy to the load side units 300.

In FIG. 1, "a" or "b" is added and shown after the reference signs of some devices included in the "heat source side unit 100". In the following description, "a" and "b" added after the reference signs are sometimes omitted, and needless to say, in such a case, a description is given including the devices of both "a" and In the heat source side unit 100, a compressor 101, a four-way switching valve 102 which is flow path switching means, an opening/closing valve 105, an outdoor heat exchanger 103 provided with a fan 106, and an accumulator 104 are provided and connected in series to form a main refrigerant circuit.

It should be noted that each of a portion where the opening/closing valve 105a and the outdoor heat exchanger 103a are connected in series and a portion where the opening/closing valve 105b and the outdoor heat exchanger 103b are connected in series is referred to as an outdoor heat exchanger unit.

In addition, in the heat source side unit 100, check valves 107 to 115 are provided in order to make it possible to cause the refrigerant to flow in a given direction.

The check valve 112 is provided on the low-pressure pipe 401 between the refrigerant control unit 200 and the four-way switching valve 102, the check valve 108 is provided on a connection pipe 403 between the four-way switching valve 102 and the opening/closing valve 105, and the check valves 107a and 107b are provided on a connection pipe 404 between the outdoor heat exchanger 103a and a meeting portion between the two outdoor heat exchangers 103a and 103b.

Furthermore, the check valve 109 is provided on the connection pipe 404 between the refrigerant control unit 200 and the meeting portion between the two outdoor heat exchangers 103a and 103b, and the check valve 113 is provided on the high-pressure pipe 402 between the refrigerant control unit 200 and the meeting portion between the two outdoor heat exchangers 103a and 103b.

The low-pressure pipe 401 and the high-pressure pipe 402 are connected to each other by: a first connection pipe 120 which connects the downstream side of the check valve 112 and the downstream side of the check valve 113; and a second connection pipe 121 which connects the upstream side of the check valve 112 and the upstream side of the check valve 113.

In addition, the connection pipe 403 and the connection pipe 404 are connected to each other by: a third connection pipe 122 which connects the downstream side of the check valve 108 and the downstream side of the check valve 109; and a fourth connection pipe 123 which connects the upstream side of the check valve 108 and the upstream side of the check valve 109.

The check valve 115 is provided on the first connection pipe 120 and permits the refrigerant to flow only in the direction from the low-pressure pipe 401 to the high-pressure pipe 402, and the check valve 114 is provided also on the second connection pipe 121 and permits the refrigerant to flow only in the direction from the low-pressure pipe 401 to the high-pressure pipe 402.

In addition, the check valve 110 is provided on the third connection pipe 122 and permits the refrigerant to flow only in the direction from the connection pipe 404 to the connection pipe 403, and the check valve 111 is provided also on the fourth connection pipe 123 and permits the refrigerant to flow only in the direction from the connection pipe 404 to the connection pipe 403.

In the heat source side unit 100, a high-pressure sensor 141 is provided between the compressor 101 and the four-way switching valve 102. Also, a low-pressure sensor 142 is provided between the four-way switching valve 102 and the accumulator 104.

The compressor 101 sucks low-temperature and low-pressure gas refrigerant, compresses the refrigerant into high-temperature and high-pressure gas refrigerant, and circulates the refrigerant within the system, thereby causing air-conditioning to be performed. The compressor 101 may be composed of, for example, a capacity-controllable inverter-type compressor. However, the compressor 101 is not limited to the capacity-controllable inverter-type compressor, and may be a constant-speed-type compressor or may be a compressor which is a combination of an inverter-type and a constant-speed-type.

The four-way switching valve 102 is provided at the discharge side of the compressor 101, switches a refrigerant flow path in a cooling operation and a heating operation, and controls a flow of the refrigerant such that the outdoor heat exchanger 103 serves as an evaporator or a condenser in accordance with an operation mode.

The outdoor heat exchanger 103 exchanges heat between a heat medium (e.g., the ambient air, water, etc.) and the refrigerant, serves as an evaporator to evaporate and gasify the refrigerant during a heating operation, and serves as a condenser (radiator) to condense and liquefy the refrigerant during a cooling operation. If the outdoor heat exchanger 103 is an air-cooled heat exchanger, the outdoor heat exchanger 103 is generally provided with the fan 106, and condensing capacity or evaporating capacity thereof is controlled based on a rotation speed of the fan 106, command frequency provided to the fan 106, the power consumption of the fan 106, the value of a current flowing through the fan 106, and the like.

In Embodiment, the single fan 106 is provided for the two outdoor heat exchangers 103a and 103b, but the fan 106 may be provided for each outdoor heat exchanger 103.

In addition, in Embodiment, the condensing capacity or evaporating capacity is controlled based on the rotation speed of the fan 106.

The accumulator 104 is provided at the suction side of the compressor 101 and has a function to store excess refrigerant and a function to separate liquid refrigerant and gas refrigerant. The accumulator 104 may be a container capable of storing excess refrigerant.

The opening/closing valve 105a is provided at an upstream portion of the outdoor heat exchanger 103a, and the opening/closing valve 105b is provided at an upstream portion of the outdoor heat exchanger 103b, and these opening/closing valves allow the refrigerant to flow therethrough or does not allow the refrigerant to flow therethrough by opening/closing thereof being controlled. That is, the opening/closing valves 105a and 105b adjust the flow of the refrigerant to the outdoor heat exchanger 103 by opening/closing thereof being controlled.

The first connection pipe 120 connects the high-pressure pipe 402 at the downstream side of the check valve 113 and the low-pressure pipe 401 at the downstream side of the check valve 112.

The second connection pipe 121 connects the high-pressure pipe 402 at the upstream side of the check valve 113 and the low-pressure pipe 401 at the upstream side of the check valve 112.

It should be noted that a meeting portion between the second connection pipe 121 and the high-pressure pipe 402 is shown as a meeting portion a, a meeting portion between the first connection pipe 120 and the high-pressure pipe 402 is shown as a meeting portion b (downstream of the meeting portion a), a meeting portion between the second connection pipe 121 and the low-pressure pipe 401 is shown in as a meeting portion c, and a meeting portion between the first connection pipe 120 and the low-pressure pipe 401 is shown as a meeting portion d (downstream of the meeting portion c).

The check valve 112 is provided between the meeting portion c and the meeting portion d and permits the refrigerant to flow only in the direction from the meeting portion c to the meeting portion d. The check valve 113 is provided between the meeting portion a and the meeting portion b and permits the refrigerant to flow only in the direction from the meeting portion a to the meeting portion b. The check valve 115 is provided on the first connection pipe 120 and permits the refrigerant to flow only in the direction from the meeting portion d to the meeting portion b. The check valve 114 is provided on the second connection pipe 121 and permits the refrigerant to flow only in the direction from the meeting portion c to the meeting portion a.

The third connection pipe 122 connects the high-pressure pipe 402 at the downstream side of the check valve 109 and the connection pipe 403 at the downstream side of the check valve 108.

The fourth connection pipe 123 connects the connection pipe 404 at the upstream side of the check valve 109 and the connection pipe 403 at the upstream side of the check valve 108.

It should be noted that a meeting portion between the fourth connection pipe 123 and the connection pipe 404 is shown as a meeting portion e, a meeting portion between the fourth connection pipe 123 and the high-pressure pipe 402 is shown as a meeting portion f (downstream of the meeting portion e), a meeting portion between the fourth connection pipe 123 and the connection pipe 403 is shown as a meeting portion g, and a meeting portion between the third connection pipe 122 and the connection pipe 403 is shown as a meeting portion h (downstream of the meeting portion g).

The check valve 108 is provided between the meeting portion g and the meeting portion h and permits the refrigerant to flow only in the direction from the meeting portion g to the meeting portion h. The check valve 109 is provided between the meeting portion e and the meeting portion f and permits the refrigerant to flow only in the direction from the meeting portion e to the meeting portion f. The check valve 110 is provided on the third connection pipe 122 and permits the refrigerant to flow only in the direction from the meeting portion f to the meeting portion h. The check valve 111 is provided on the fourth connection pipe 123 and permits the refrigerant to flow only in the direction from the meeting portion e to the meeting portion g. The check valve 107 is provided between the outdoor heat exchanger 103 and the meeting portion e and permits the refrigerant to flow only in the direction from the outdoor heat exchanger 103 to the meeting portion e.

The high-pressure sensor 141 is provided at the discharge side of the compressor 101 and detects the pressure of the refrigerant discharged from the compressor 101, and the low-pressure sensor 142 is provided at the suction side of the compressor 101 and detects the pressure of the refrigerant sucked into the compressor 101.

The high-pressure sensor 141 and the low-pressure sensor 142 are used as temperature detection means for obtaining later-described condensing temperature Tc and evaporating temperature Te of the refrigerant.

Pressure information detected by these temperature detection means is sent to a controller 124 which controls operation of the air-conditioning apparatus 500, and is used for controlling the operating frequency of the compressor 101, the rotation speed of the fan 106, and switching of the four-way switching valve 102.

[Refrigerant Control Unit 200]

The refrigerant control unit 200 is provided between the heat source side unit 100 and the load side unit 300 and switches a flow of the refrigerant in accordance with operating states of the load side unit 300.

It should be noted that in FIG. 1, "a" or "b" is added and shown after the reference signs of some devices included in the "refrigerant control unit 200". This indicates being connected to the "load side unit 300a" described later or being connected to the "load side unit 300b" described later. In the following description, "a" and "b" added after the reference signs are sometimes omitted, and needless to say, in such a case, a description is given including either device connected to the "load side unit 300a" or the "load side unit 300b".

The refrigerant control unit 200 is connected to the heat source side unit 100 by the high-pressure pipe 402 and the low-pressure pipe 401 and is connected to the load side unit 300 by the liquid pipe 406 and the gas pipe 405. The refrigerant control unit 200 is equipped with a gas-liquid separator 211, a first opening/closing valve 212 (first opening/closing valves 212a and 212b), a second opening/closing valve 213 (second opening/closing valves 213a and 213b), a first expansion device 214, a second expansion device 215, a first refrigerant heat exchanger 216, and a second refrigerant heat exchanger 217. In addition, a connection pipe 221 is provided at a primary side of the first refrigerant heat exchanger 216 and the second refrigerant heat exchanger 217, and a connection pipe 220 is provided at a secondary side thereof. It should be noted that the primary side of the first refrigerant heat exchanger 216 and the second refrigerant heat exchanger 217 is a side at which liquid refrigerant separated by the gas-liquid separator 211 flows, and the secondary side thereof is a side at which refrigerant for subcooling the refrigerant flowing through the primary side flows via the first expansion device 214 and the second expansion device 215.

The gas-liquid separator 211 is provided at a connection portion between the high-pressure pipe 402 and the connection pipe 221 and has a function to separate the two-phase refrigerant flowing thereto through the high-pressure pipe 402, into gas refrigerant and liquid refrigerant. The gas refrigerant separated by the gas-liquid separator 211 is supplied via the connection pipe 221 to the first opening/closing valve 212, and the liquid refrigerant separated by the gas-liquid separator 211 is supplied to the first refrigerant heat exchanger 216.

The first opening/closing valve 212 serves to control supply of the refrigerant to the load side unit 300 for each operation mode and is provided between the connection pipe 221 and the gas pipe 405. That is, the first opening/closing valve 212 is connected at one side to the gas-liquid separator 211 and at the other side to an indoor heat exchanger 312 of the load side unit 300, and opening/closing thereof is controlled to permit or not permit the refrigerant to flow therethrough.

The second opening/closing valve 213 serves to control supply of the refrigerant to the load side unit 300 for each operation mode and is provided between the connection pipe 220 and the gas pipe 405. That is, the second opening/closing valve 213 is connected at one side to the first refrigerant heat exchanger 216 and at the other side to the indoor heat exchanger 312 of the load side unit 300, and opening/closing thereof is controlled to permit or not permit the refrigerant to flow therethrough.

The first expansion device 214 is provided on the connection pipe 221 and between the first refrigerant heat exchanger 216 and the second refrigerant heat exchanger 217, and has functions as a pressure reducing valve and an expansion valve, and reduces the pressure of the refrigerant to expand the refrigerant. The first expansion device 214 may be composed of a device whose opening degree is variably controllable, for example, an accurate flow rate control device composed of an electric expansion valve, or cheap refrigerant flow rate adjusting means such as a capillary tube.

The second expansion device 215 is provided on the connection pipe 220 and at the upstream side of the secondary side of the second refrigerant heat exchanger 217, and has functions as a pressure reducing valve and an expansion valve, and reduces the pressure of the refrigerant to expand the refrigerant. Similarly to the first expansion device 214, the second expansion device 215 may be composed of a device whose opening degree is variably controllable, for example, an accurate flow rate control device composed of an electric expansion valve, or cheap refrigerant flow rate adjusting means such as a capillary tube.

The first refrigerant heat exchanger 216 exchanges heat between the refrigerant flowing at the primary side thereof and the refrigerant flowing at the secondary side thereof.

The second refrigerant heat exchanger 217 exchanges heat between the refrigerant at the primary side thereof and the refrigerant flowing at the secondary side thereof.

The refrigerant control unit 200 exchanges heat between the refrigerant flowing at the primary side and the refrigerant flowing at the secondary side by the first refrigerant heat exchanger 216 and the second refrigerant heat exchanger 217 to subcool the refrigerant flowing at the primary side.

In addition, the refrigerant control unit 200 controls each bypass amount such that appropriate subcooling is achieved at the primary side outlet of the first refrigerant heat exchanger 216 by the opening degree of the first expansion device 214 and appropriate subcooling is achieved at the primary side outlet of the second refrigerant heat exchanger 217 by the opening degree of the second expansion device 215.

[Load Side Unit 300]

The load side unit 300 is supplied with cooling energy or heating energy from the heat source side unit 100 and takes charge of a cooling load or a heating load.

It should be noted that in FIG. 1, "a" is added and shown after the reference sign of each device included in "load side unit 300a", and "b" is added and shown after the reference sign of each device included in "load side unit 300b". In the following description, "a" and "b" added after the reference signs are sometimes omitted, and needless to say, in such a case, each device is included in not only the load side unit 300a but also the load side unit 300b.

In the load side unit 300, the indoor heat exchanger 312 (indoor heat exchangers 312a and 312b) and an indoor expansion device 311 (indoor expansion devices 311a and 311b) are provided so as to be connected in series.

In addition, a temperature sensor 313 (temperature sensors 313a and 313b) is provided between the indoor heat exchanger 312, and the first opening/closing valve 212 and the second opening/closing valve 213, and a temperature sensor 314 (temperature sensors 314a and 314b) is provided between the indoor expansion device 311 and the indoor heat exchanger 312, and a temperature sensor 315 (temperature sensors 315a and 315b) is provided at or near the indoor heat exchanger 312.

It should be noted that a fan which is not shown may be provided near the indoor heat exchanger 312 for supplying air to the indoor heat exchanger 312.

The indoor expansion device 311 has functions as a pressure reducing valve and an expansion valve and reduces the pressure of the refrigerant to expand the refrigerant. The indoor expansion device 311 may be composed of a device whose opening degree is variably controllable, for example, an accurate flow rate control device composed of an electric expansion valve, or cheap refrigerant flow rate adjusting means such as a capillary tube.

The indoor heat exchanger 312 exchanges heat between a heat medium (e.g., the ambient air, water, etc.) and the refrigerant, serves as a condenser (radiator) to condense and liquefy the refrigerant during a heating operation, and serves as an evaporator to evaporate and gasify the refrigerant during a cooling operation. The indoor heat exchanger 312 is generally provided with a fan which is not shown, and condensing capacity or evaporating capacity thereof is controlled based on a rotation speed of the fan, command frequency provided to the fan, the power consumption of the fan, the value of a current flowing through the fan, and the like.

It should be noted that in Embodiment, the condensing capacity or evaporating capacity is controlled based on the rotation speed of the fan.

The temperature sensor 313 detects the temperature of a refrigerant pipe between the indoor heat exchanger 312 and each of the first opening/closing valve 212 and the second opening/closing valve 213.

The temperature sensor 314 detects the temperature of a refrigerant pipe between the indoor expansion device 311 and the indoor heat exchanger 312.

The temperature sensor 315 detects a later-described load side suction temperature Ta of indoor air at the indoor heat exchanger 312.

In addition, information (temperature information) detected by the temperature sensors 313 to 315 which are load detection means is sent to the controller 124, which controls operation of the air-conditioning apparatus 500, and is utilized for controlling various actuators. That is, the information from the temperature sensors 313 to 315 is utilized for controlling the opening degree of the indoor expansion device 311 provided in the load side unit 300, the rotation speed of the fan, which is not shown, and the like.

It should be noted that the type of the compressor 101 is not particularly limited, as long as it is able to compress sucked refrigerant into a high-pressure state. For example, the compressor 101 may be configured by using various types such as reciprocating, rotary, scroll, or screw. In addition, the type of the refrigerant used for the air-conditioning apparatus 500 is not particularly limited, and natural refrigerant such as carbon dioxide, hydrocarbon, or helium, chlorine-free alternative refrigerant such as HFC410A, HFC407C, or HFC404A, or fluorocarbon refrigerant used for existing products such as R22 or R134a may be used.

In addition, FIG. 1 shows, as an example, the case where the heat source side unit 100 is equipped with the controller 124 which controls operation of the air-conditioning apparatus 500, but the controller 124 may be provided in either the refrigerant control unit 200 or the load side unit 300. Alternatively, the controller 124 may be provided outside the heat source side unit 100, the refrigerant control unit 200, and the load side unit 300. Still alternatively, the controller 124 may be divided into a plurality of controllers based on functions thereof, and the respective controllers may be provided in the heat source side unit 100, the refrigerant control unit 200, and the load side unit 300. In this case, the respective controllers may be connected to each other wirelessly or via wires to be able to communicate with each other.

Here, an operation of each mode executed by the air-conditioning apparatus 500 will be described.

In the air-conditioning apparatus 500, for example, an air-conditioning operation is performed upon reception of a cooling operation request or a heating operation request from a remote controller installed in a room, and four operation modes corresponding to these requests are present. The four operation modes include: a cooling only operation mode in which all of the load side units 300 make cooling operation requests; a cooling main operation mode in which cooling operation requests and heating operation requests are present together, and it is determined that there are many loads to be handled by a cooling operation (the sum of respective loads of the load side units 300 that perform a cooling operation is higher than the sum of respective loads of the load side units 300 that perform a heating operation); a heating main operation mode in which cooling operation requests and heating operation requests are present together, and it is determined that there are many loads to be handled by a heating operation (the sum of respective loads of the load side units 300 that perform a heating operation is higher than the sum of respective loads of the load side units 300 that perform a cooling operation); and a heating only operation mode in which all the load side units 300 make heating operation requests.

[Heating Only Operation Mode]

Figure 2:
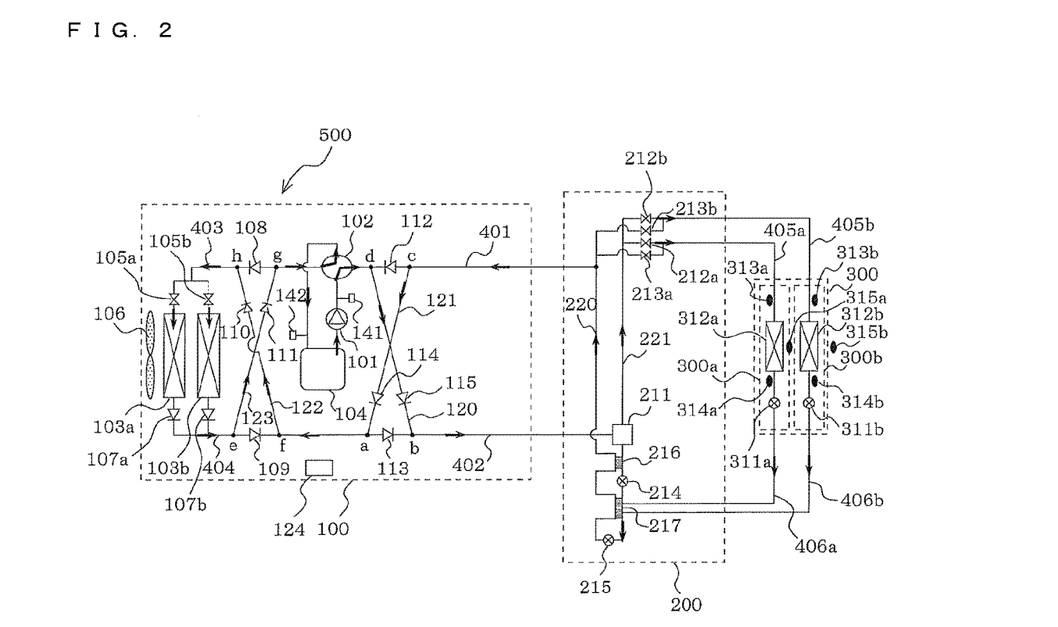
FIG. 2 is a refrigerant circuit diagram showing a flow of refrigerant during a heating only operation mode of the air-conditioning apparatus according to Embodiment of the present invention.

FIG. 2 is a refrigerant circuit diagram showing a flow of the refrigerant during the heating only operation mode of the air-conditioning apparatus 500 according to Embodiment of the present invention. An operation during the heating only operation mode of the air-conditioning apparatus 500 will be described with reference to FIG. 2.

The low-temperature and low-pressure refrigerant is compressed by the compressor 101 into high-temperature and high-pressure gas refrigerant, and the gas refrigerant is discharged therefrom. The high-temperature and high-pressure gas refrigerant discharged from the compressor 101 flows via the four-way switching valve 102, passes through the check valve 115 and flows through the high-pressure pipe 402 to flow out from the heat source side unit 100 to the refrigerant control unit 200.

The gas refrigerant having flowed into the refrigerant control unit 200 flows into the gas-liquid separator 211 and flows through the connection pipe 221 to the first opening/closing valve 212. At that time, the first opening/closing valve 212 is opened, and the second opening/closing valve 213 is closed. Then, the high-temperature and high-pressure gas refrigerant having passed through the first opening/closing valve 212 flows through the gas pipe 405 to flow out from the refrigerant control unit 200 to the load side unit 300.

The gas refrigerant having flowed into the load side unit 300 flows into the indoor heat exchanger 312 (the indoor heat exchanger 312a and the indoor heat exchanger 312b). Since the indoor heat exchanger 312 serves as a condenser, the refrigerant exchanges heat with the ambient air to condense and liquefy. At that time, the refrigerant rejects heat, whereby an air-conditioned space such as the interior of a room is heated. Thereafter, the liquid refrigerant having flowed out from the indoor heat exchanger 312 is reduced in pressure by the indoor expansion device 311 (the indoor expansion device 311a and the indoor expansion device 311b) and flows through the liquid pipe 406 (the liquid pipe 406a and the liquid pipe 406b) to flow out from the load side unit 300 to the refrigerant control unit 200.

The liquid refrigerant having flowed into the refrigerant control unit 200 passes through the second expansion device 215 and flows through the connection pipe 220 to the low-pressure pipe 401. Then, the liquid refrigerant flows through the low-pressure pipe 401 to flow out from the refrigerant control unit 200, and returns to the heat source side unit 100.

The refrigerant having returned to the heat source side unit 100 passes through the check valve 114 and the check valve 110 to the outdoor heat exchanger 103 (the outdoor heat exchanger 103a and the outdoor heat exchanger 103b). At that time, the opening/closing valve 105 is opened. Since the outdoor heat exchanger 103 serves as an evaporator, the refrigerant exchanges heat with the ambient air to evaporate and gasify. Thereafter, the gas refrigerant having flowed out from the outdoor heat exchanger 103 flows via the four-way switching valve 102 into the accumulator 104. Then, the gas refrigerant within the accumulator 104 is sucked into the compressor 101 and circulated within the system, whereby a refrigeration cycle is established.

Through the above flow, the air-conditioning apparatus 500 executes the heating only operation mode.

During the heating only operation mode, the operating frequency of the compressor 101 is controlled such that the condensing temperature Tc calculated from a discharge pressure (of the refrigerant discharged from the compressor 101) detected with the high-pressure sensor 141, which is the temperature detection means, coincides with a target condensing temperature Tcm. In addition, the rotation speed of the fan 106 is controlled such that the evaporating temperature Te calculated from a suction pressure (of the refrigerant sucked into the compressor 101) detected with the low-pressure sensor 142, which is the temperature detection means, coincides with a target evaporating temperature Tem.

Therefore, if a heating load increases with the operating frequency of the compressor 101 kept constant, the condensing temperature Tc decreases. Then, the target condensing temperature Tcm is increased and the operating frequency of the compressor 101 is increased such that the condensing temperature Tc coincides with Tcm, thereby achieving an operation of increasing the heating capacity.

Conversely, if a heating load decreases with the operating frequency of the compressor 101 kept constant, the condensing temperature Tc increases. Then, the target condensing temperature Tcm is decreased and the operating frequency of the compressor 101 is deceased such that the condensing temperature Tc coincides with Tcm, thereby achieving an operation of decreasing the heating capacity. Thus, it is possible to reduce the power consumption.

In addition, a load of the load side unit 300 is obtained based on the difference ΔTh between a set temperature To and the load side suction temperature Ta of the indoor air at the indoor heat exchanger 312 which is detected with the temperature sensor 315, which is the load detection means. If the heating load decreases, the load side suction temperature Ta and the set temperature To are close to each other. Then, if the temperature difference ΔTh=To−Ta during the heating operation is less than a predetermined value ΔTho (ΔTh<ΔTho), it is determined that the load is low, and a target condensing temperature initial value Tcm0 is changed to a target condensing temperature change value Tcm1. At that time, Tcm1 may be a fixed value, or may be a function of the temperature difference ΔTh, but Tcm0>Tcm1. Here, Ta may be an arithmetic mean or may be a weighted mean based on capacity when a plurality of the load side units 300 operate. In addition, for Ta, the load side unit 300 having a maximum temperature difference ΔTh among the connected load side units 300 may be selected as a representative one.

In any of the cases, Tcm0 becomes Tcm1 (<Tcm0), and the operating frequency of the compressor 101 decreases according to the target. Thus, it is possible to reduce the power consumption.

It should be noted that the outdoor heat exchanger 103 is configured to be able to control a flow of the refrigerant flowing through the outdoor heat exchanger 103 by an opening/closing operation of the opening/closing valve 105. In Embodiment, the outdoor heat exchanger 103 is configured to be divided into the two outdoor heat exchangers 103a and 103b as shown in FIG. 2, but may be configured with three or more outdoor heat exchangers by providing the opening/closing valve 105 and the check valve 107 in front of and in rear of the outdoor heat exchanger 103.

That is, opening/closing of each opening/closing valve 105 is controlled in accordance with the load of the load side unit 300 to select a volume of the outdoor heat exchanger 103 which exchanges heat (the number of the outdoor heat exchangers 103 into which the refrigerant is caused to flow), and if the division number increases, the number of volumes to be selected also increases.

In addition, when a heating load is low, the maximum volume may be selected as the volume of the outdoor heat exchanger 103. That is, in FIG. 2, the opening/closing valves 105a and 105b are opened to increase the heat exchange volume. By so doing, when the heating load is low, even if the rotation speed of the fan 106 is made minimum, it is possible to cause the evaporating temperature Te to coincide with the target evaporating temperature Tem, and thus it is possible to reduce the power consumption of the fan 106.

Because of the above, the operating frequency of the compressor 101 is controlled such that the condensing temperature Tc coincides with the target condensing temperature Tcm, and the rotation speed of the fan 106 is controlled such that the evaporating temperature Te coincides with the target evaporating temperature Tem.

Thus, if the heating load decreases with the operating frequency of the compressor 101 kept constant, the condensing temperature Tc increases. Then, the target condensing temperature Tcm is decreased and the operating frequency of the compressor 101 is decreased such that the condensing temperature Tc coincides with Tcm, thereby achieving an operation of decreasing the heating capacity. Thus, it is possible to reduce the power consumption.

In addition, when the heating load is low, the load side suction temperature Ta and the set temperature To are close to each other. Thus, if the temperature difference ΔTh=To−Ta during the heating operation is less than the predetermined value ΔTho, it is determined that the load is low, and the target condensing temperature initial value Tcm0 is changed to the target condensing temperature change value Tcm1 (<Tcm0). By so doing, the operating frequency of the compressor 101 decreases according to the target. Thus, it is possible to reduce the power consumption.

In addition, when the heating load is low, the maximum volume is selected as the volume of the outdoor heat exchanger 103. By so doing, when the heating load is low, it is possible to cause the evaporating temperature Te to coincide with the target evaporating temperature Tem even if the rotation speed of the fan 106 is made minimum. Thus, it is possible to reduce the power consumption of the fan 106.

It should be noted that even when the heating load is high, by decreasing the operating frequency of the compressor 101, it is possible to reduce the power consumption, but the heating capacity also decreases at the same time. Thus, the case where the heating load is low and the heating capacity is not required is determined, and an efficient operation is performed at that time.

In Embodiment, an air-cooled type is taken as an example, and the rotation speed of the fan 106 is monitored, but a water-cooled type may be taken as an example, a water pump control value (frequency, power consumption, current) may be monitored for controlling the opening/closing valves 105a and 105b.

By performing control as described above, it is possible to obtain an air-conditioning apparatus 500 having a high energy-saving effect.

In addition, when a cooling operation and a heating operation are present together as operation requests provided to the air-conditioning apparatus 500 and it is determined that a load to be processed by the heating operation is higher, the operation mode becomes the heating main operation mode.

[Heating Main Operation Mode]

Figure 3:
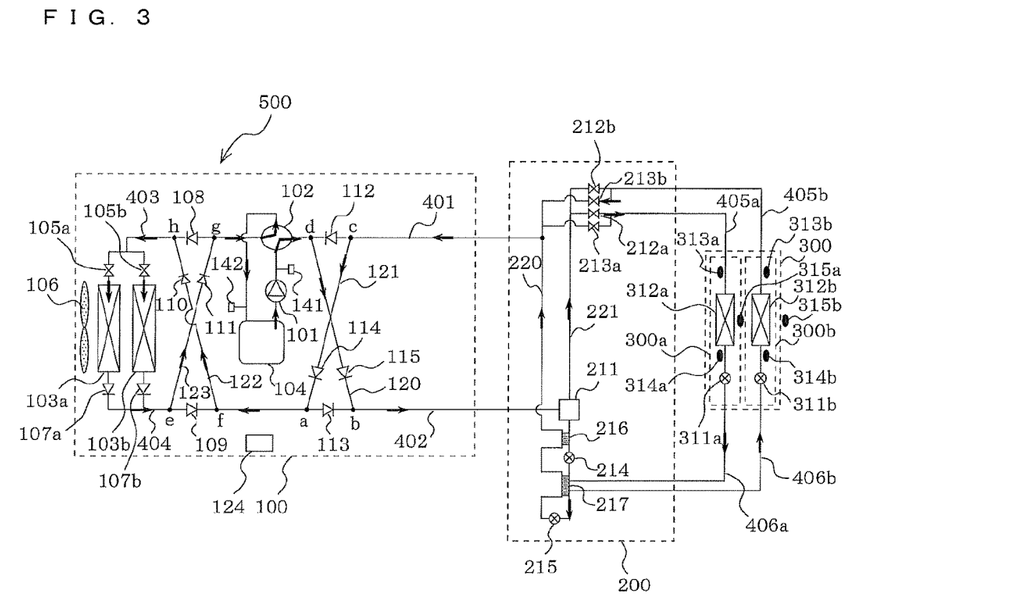
FIG. 3 is a refrigerant circuit diagram showing a flow of the refrigerant during a heating main operation mode of the air-conditioning apparatus according to Embodiment of the present invention.

FIG. 3 is a refrigerant circuit diagram showing a flow of the refrigerant during the heating main operation mode of the air-conditioning apparatus 500 according to Embodiment of the present invention. An operation during the heating main operation mode of the air-conditioning apparatus 500 will be described with reference to FIG. 3. Here, the heating main operation mode when there is a heating request from the load side unit 300a and a cooling request from the load side unit 300b, will be described.

It should be noted that a flow of the refrigerant to the load side unit 300a, from which there is the heating request is the same as that during the heating only operation mode, and thus the description thereof is omitted.

The liquid refrigerant flowing through the liquid pipe 406a is subcooled by the second refrigerant heat exchanger 217, and then flows through the liquid pipe 406b to the load side unit 300b from which there is the cooling request. The liquid refrigerant having flowed into the load side unit 300b is reduced in pressure by the indoor expansion device 311b. The liquid refrigerant reduced in pressure by the indoor expansion device 311b flows into the indoor heat exchanger 312b. Since the indoor heat exchanger 312b serves as an evaporator, the liquid refrigerant exchanges heat with the ambient air to evaporate and gasify. At that time, the refrigerant receives heat from the surroundings, whereby the interior of the room is cooled. Thereafter, the gas refrigerant having flowed out from the load side unit 300b passes through the second opening/closing valve 213b and flows through the connection pipe 220. The gas refrigerant meets the refrigerant that has flowed through the connection pipe 220 by passing through the first expansion device 214 and the second expansion device 215 in order to be subcooled by the second refrigerant heat exchanger 217, to become two-phase gas-liquid refrigerant, then flows through the low-pressure pipe 401 to flow out from the refrigerant control unit 200, and returns to the heat source side unit 100.

The two-phase gas-liquid refrigerant having returned to the heat source side unit 100 passes through the check valve 114 and the check valve 110 to the outdoor heat exchanger 103 (the outdoor heat exchanger 103a and the outdoor heat exchanger 103b). At that time, the opening/closing valve 105a is opened. Since the outdoor heat exchanger 3 serves as an evaporator, the two-phase gas-liquid refrigerant exchanges heat with the ambient air to evaporate and gasify. Thereafter, the gas refrigerant having flowed out from the outdoor heat exchanger 103 flows via the four-way switching valve 102 into the accumulator 104. Then, the gas refrigerant within the accumulator 104 is sucked into the compressor 101 and circulated within the system, whereby a refrigeration cycle is established. Through the above flow, the air-conditioning apparatus 500 executes the heating main operation mode.

In the heating main operation mode as well, similarly to the heating only operation mode, by changing the target condensing temperature Tcm and the target evaporating temperature Tem in accordance with the heating load, it is possible to reduce the power consumption.

By performing control as described above, it is possible to obtain an air-conditioning apparatus 500 having a high energy-saving effect.

It should be noted that in Embodiment, the case has been shown in which there are the single heat source side unit 100, the single refrigerant control unit 200, and the two load side units 300, but the number of each kinds of units is not particularly limited. In addition, in Embodiment, the case where the present invention is applied to the air-conditioning apparatus 500 has been described, but the present invention is also applicable to another system that forms a refrigerant circuit by using a refrigeration cycle, such as a refrigerating system.

[Cooling Only Operation Mode]

Figure 4:
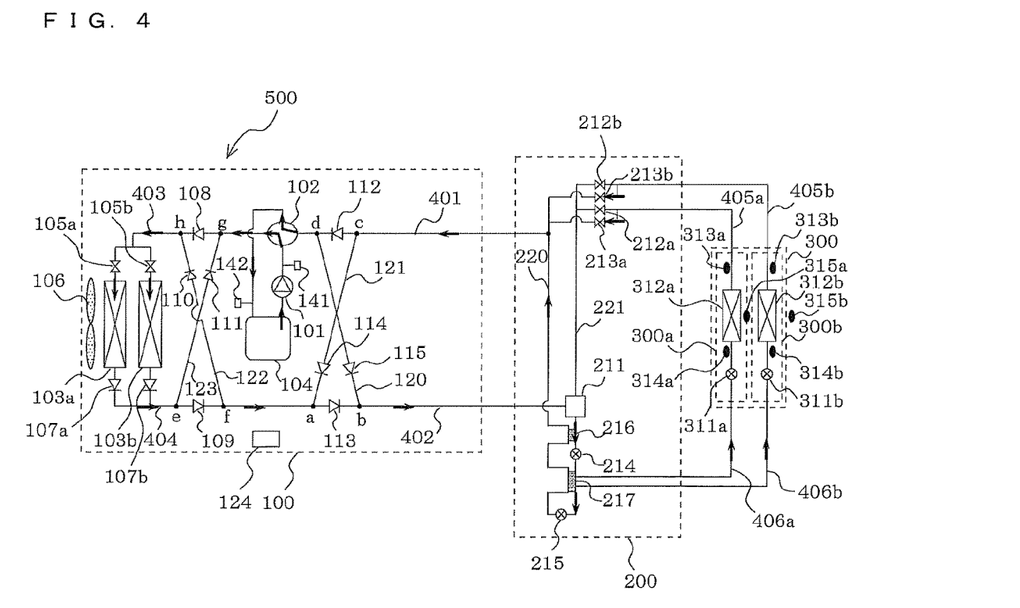
FIG. 4 is a refrigerant circuit diagram showing a flow of the refrigerant during a cooling only operation mode of the air-conditioning apparatus according to Embodiment of the present invention.

FIG. 4 is a refrigerant circuit diagram showing a flow of the refrigerant during the cooling only operation mode of the air-conditioning apparatus 500 according to Embodiment of the present invention. An operation during the cooling only operation mode of the air-conditioning apparatus 500 will be simply described with reference to FIG. 4.

The low-temperature and low-pressure refrigerant is compressed by the compressor 101 into high-temperature and high-pressure gas refrigerant, and the gas refrigerant is discharged therefrom. The high-temperature and high-pressure gas refrigerant discharged from the compressor 101 flows via the four-way switching valve 102 and passes through the check valve 108 to the opening/closing valve 105. At that time, the opening/closing valve 105 is opened. Then, the gas refrigerant having passed through the opening/closing valve 105 flows to the outdoor heat exchanger 103. Since the outdoor heat exchanger 103 serves as a condenser, the gas refrigerant exchanges heat with the ambient air to condense and liquefy. Thereafter, the high-pressure liquid refrigerant having flowed out from the outdoor heat exchanger 103 flows through the connection pipe 404, passes through the check valve 109 and the check valve 113, and flows through the high-pressure pipe 402 to flow out from the heat source side unit 100 to the refrigerant control unit 200.

The liquid refrigerant having flowed into the refrigerant control unit 200 flows into the gas-liquid separator 211 and flows into the primary side of the first refrigerant heat exchanger 216. There, the liquid refrigerant is subcooled by the refrigerant flowing through the secondary side of the first refrigerant heat exchanger 216. The liquid refrigerant having an increased degree of subcooling is reduced in pressure to an intermediate pressure by the first expansion device 214. Then, the liquid refrigerant flows to the second refrigerant heat exchanger 217 and is further subcooled. Thereafter, the liquid refrigerant divides, and part thereof flows through the liquid pipe 406 (the liquid pipe 406a and the liquid pipe 406b) to flow out from the refrigerant control unit 200 to the load side unit 300.

The liquid refrigerant having flowed into the load side unit 300 is reduced in pressure by the indoor expansion device 311 (the indoor expansion device 311a and the indoor expansion device 311b) and becomes low-temperature and two-phase gas-liquid refrigerant. The low-temperature and two-phase gas-liquid refrigerant flows into the indoor heat exchanger 312 (the indoor heat exchanger 312a and the indoor heat exchanger 312b). Since the indoor heat exchanger 312 serves as an evaporator, the refrigerant exchanges heat with the ambient air to evaporate and gasify. At that time, the refrigerant receives heat from the surroundings, whereby the interior of the room is cooled. Thereafter, the gas refrigerant having flowed out from the indoor heat exchanger 312 flows through the gas pipe 405 (the gas pipe 405a and the gas pipe 405b) to flow out from the load side unit 300 to the refrigerant control unit 200.

The gas refrigerant having flowed into the refrigerant control unit 200 flows to the second opening/closing valve 213. At that time, the second opening/closing valve 213 is opened, and the first opening/closing valve 212 is closed. Then, the gas refrigerant having passed through the second opening/closing valve 213 meets the refrigerant that has flowed through the connection pipe 220 by passing through the first expansion device 214 and the second expansion device 215 in order to be subcooled by the second refrigerant heat exchanger 217, then flows through the low-pressure pipe 401 to flow out from the refrigerant control unit 200, and returns to the heat source side unit 100.

The gas refrigerant having returned to the heat source side unit 100 passes through the check valve 112 and flows via the four-way switching valve 102 into the accumulator 104. Then, the gas refrigerant within the accumulator 104 is sucked into the compressor 101 and circulated within the system, whereby a refrigeration cycle is established. Through the above flow, the air-conditioning apparatus 500 executes the cooling only operation mode.

During the cooling only operation mode, the operating frequency of the compressor 101 is controlled such that the evaporating temperature Te calculated from the suction pressure (of the refrigerant sucked into the compressor 101) detected with the low-pressure sensor 142, which is the temperature detection means, coincides with the target evaporating temperature Tem. In addition, the rotation speed of the fan 106 is controlled such that the condensing temperature Tc calculated from the discharge pressure (of the refrigerant discharged from the compressor 101) detected with the high-pressure sensor 141, which is the temperature detection means, coincides with the target condensing temperature Tcm.

Therefore, if a cooling load increases with the operating frequency of the compressor 101 kept constant, the evaporating temperature Te increases. Then, the target evaporating temperature Tem is decreased and the operating frequency of the compressor 101 is increased such that the evaporating temperature Te coincides with Tem, thereby achieving an operation of increasing the cooling capacity.

Conversely, if a cooling load decreases with the operating frequency of the compressor 101 kept constant, the evaporating temperature Te decreases. Then, the target evaporating temperature Tem is increased and the operating frequency of the compressor 101 is decreased such that the evaporating temperature Te coincides with Tem, thereby achieving an operation of decreasing the cooling capacity. Thus, it is possible to reduce the power consumption.

A load of the load side unit 300 is obtained based on the difference $\Delta Tc$ between the set temperature To and the load side suction temperature Ta of the indoor air which is detected with the temperature sensor 315, which is the load detection means. If the heating load decreases, the load side suction temperature Ta and the set temperature To are close to each other. Then, if the temperature difference $\Delta Tr=Ta-To$ during the cooling operation is less than a predetermined value $\Delta Tro$ ($\Delta Tr \geq \Delta Tro$), it is determined that the load is low, and a target evaporating temperature initial value Tem0 is changed to a target evaporating temperature change value Tem1. At that time, Tem1 may be a fixed value, or may be a function of the temperature difference $\Delta Tr$, but Tem0<Tem1. Here, Ta may be an arithmetic mean or may be a weighted mean based on capacity when a plurality of the load side units 300 operate. In addition, for Ta, the load side unit 300 having a maximum temperature difference $\Delta Tr$ among the connected load side units 300 may be selected as a representative one. In any of the cases, Tem0 becomes Tem1 (>Tem0), and the operating frequency of the compressor 101 decreases according to a target. Thus, it is possible to reduce the power consumption.

In addition, when a cooling load is low, the maximum volume may be selected as the volume of the outdoor heat exchanger 103. That is, in FIG. 4, the opening/closing valves 105a and 105b are opened to increase the heat exchange volume. By so doing, when the cooling load is low, even if the rotation speed of the fan 106 is made minimum, it is possible to cause the condensing temperature Tc to coincide with the target condensing temperature Tcm, and thus it is possible to reduce the power consumption of the fan 106.

Because of the above, the operating frequency of the compressor 101 is controlled such that the evaporating temperature Te coincides with the target evaporating temperature Tem, and the rotation speed of the fan 106 is controlled such that the condensing temperature Tc coincides with the target condensing temperature Tcm.

Thus, if the cooling load decreases with the operating frequency of the compressor 101 kept constant, the evaporating temperature Te decreases. Then, the target evaporating temperature Tem is increased and the operating frequency of the compressor 101 is decreased such that the evaporating temperature Te coincides with Tem, thereby achieving an operation of decreasing the cooling capacity. Thus, it is possible to reduce the power consumption.

In addition, when the cooling load is low, the load side suction temperature Ta and the set temperature To are close to each other. Thus, if the temperature difference $\Delta Tr=To-Ta$ during the cooling operation is less than the predetermined value $\Delta Tro$, it is determined that the load is low, and the target evaporating temperature initial value Tem0 is changed to the target evaporating temperature change value Tem1 (>Tem0). By so doing, the operating frequency of the compressor 101 decreases according to the target. Thus, it is possible to reduce the power consumption.

In addition, when the cooling load is low, the maximum volume is selected as the volume of the outdoor heat exchanger 103. By so doing, when the cooling load is low, it is possible to cause the condensing temperature Tc to coincide with the target condensing temperature Tcm even if the rotation speed of the fan 106 is made minimum. Thus, it is possible to reduce the power consumption of the fan 106.

It should be noted that even when the cooling load is high, by decreasing the operating frequency of the compressor 101, it is possible to reduce the power consumption, but the cooling capacity also decreases at the same time, thus the case where the cooling load is low and the cooling capacity is not required is determined, and an efficient operation is performed at that time.

By performing control as described above, it is possible to obtain an air-conditioning apparatus 500 having a high energy-saving effect.

[Cooling Main Operation Mode]

Figure 5:
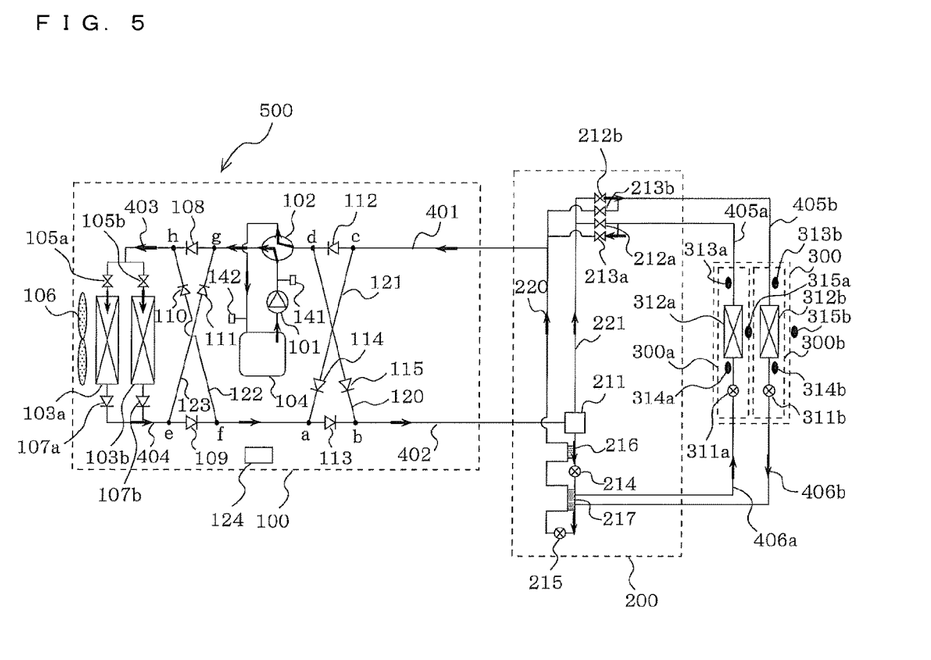
FIG. 5 is a refrigerant circuit diagram showing a flow of the refrigerant during a cooling main operation mode of the air-conditioning apparatus according to Embodiment of the present invention.

FIG. 5 is a refrigerant circuit diagram showing a flow of the refrigerant during the cooling main operation mode of the air-conditioning apparatus 500 according to Embodiment of the present invention. An operation during the cooling main operation mode of the air-conditioning apparatus 500 will be simply described with reference to FIG. 5. Here, the cooling main operation mode when there is a cooling request from the load side unit 300a and a heating request from the load side unit 300b, will be described.

The low-temperature and low-pressure refrigerant is compressed by the compressor 101 into high-temperature and high-pressure gas refrigerant, and the gas refrigerant is discharged therefrom. The high-temperature and high-pressure gas refrigerant discharged from the compressor 101 flows via the four-way switching valve 102 and passes through the check valve 108 to the opening/closing valve 105. At that time, the opening/closing valve 105 is opened. Then, the gas refrigerant having passed through the opening/closing valve 105 flows to the outdoor heat exchanger 103. Since the outdoor heat exchanger 103 serves as a condenser, the gas refrigerant exchanges heat with the ambient air to condense and liquefy. Thereafter, the high-pressure two-phase gas-liquid refrigerant having flowed out from the outdoor heat exchanger 103 flows through the connection pipe 404, passes through the check valve 109 and the check valve 113, and flows through the high-pressure pipe 402 to flow out from the heat source side unit 100 to the refrigerant control unit 200.

The two-phase gas-liquid refrigerant having flowed into the refrigerant control unit 200 flows into the gas-liquid separator 211 and is separated into gas refrigerant and liquid refrigerant by the gas-liquid separator 211. After the separation, the gas refrigerant flows out from the gas-liquid separator 211 and flows through the connection pipe 221 to the first opening/closing valve 212. At that time, the first opening/closing valve 212a is closed, and the first opening/closing valve 212b is opened. Then, the gas refrigerant having passed through the first opening/closing valve 212b flows through the gas pipe 405b into the load side unit 300b. The gas refrigerant having flowed into the load side unit 300b rejects heat to the surroundings at the indoor heat exchanger 312b thereby heating the air-conditioned space and condensing and liquefying. At that time, the refrigerant receives heat from the surroundings, whereby the interior of the room is cooled. Thereafter, the liquid refrigerant having flowed out from the indoor heat exchanger 312b is reduced in pressure to an intermediate pressure by the indoor expansion device 311b.

The intermediate-pressure liquid refrigerant reduced in pressure by the indoor expansion device 311b flows through the liquid pipe 406b into the second refrigerant heat exchanger 217. There, the liquid refrigerant meets the liquid refrigerant that has been separated by the gas-liquid separator 211, has flowed through the first refrigerant heat exchanger 216, has passed through the first expansion device 214, and has flowed into the second refrigerant heat exchanger 217. Then, the liquid refrigerant having a degree of subcooling increased further by the second refrigerant heat exchanger 217 flows through the liquid pipe 406a to flow out from the refrigerant control unit 200 to the load side unit 300a.

The liquid refrigerant having flowed into the load side unit 300 is reduced in pressure by the indoor expansion device 311a and becomes low-temperature and two-phase gas-liquid refrigerant. The low-temperature and two-phase gas-liquid refrigerant flows into the indoor heat exchanger 312a. Since the indoor heat exchanger 312a serves as an evaporator, the refrigerant exchanges heat with the ambient air to evaporate and gasify. At that time, the refrigerant receives heat from the surroundings, whereby the interior of the room is cooled. Thereafter, the gas refrigerant having flowed out from the indoor heat exchanger 312a flows through the gas pipe 405a to flow out from the load side unit 300 to the refrigerant control unit 200.

The gas refrigerant having flowed into the refrigerant control unit 200 flows to the second opening/closing valve 213. At that time, the second opening/closing valve 213a is opened, and the second opening/closing valve 213b is closed. Then, the gas refrigerant having passed through the second opening/closing valve 213a meets the refrigerant that has flowed through the connection pipe 220 by passing through the first expansion device 214 and the second expansion device 215 in order to be subcooled by the second refrigerant heat exchanger 217, then flows through the low-pressure pipe 401 to flow out from the refrigerant control unit 200, and returns to the heat source side unit 100.

The gas refrigerant having returned to the heat source side unit 100 passes through the check valve 112 and flows via the four-way switching valve 102 into the accumulator 104. Then, the gas refrigerant within the accumulator 104 is sucked into the compressor 101 and circulated within the system, whereby a refrigeration cycle is established. Through the above flow, the air-conditioning apparatus 500 executes the cooling main operation mode.

During the cooling main operation mode, the rotation speed of the fan 106 is controlled toward the target condensing temperature Tcm.

When the heating load is low, the load side suction temperature Ta during the heating operation and the set temperature To are close to each other. Therefore, similarly to the heating only operation mode, if the temperature difference $\Delta Th=To-Ta$ is less than the predetermined value $\Delta Tho$, it is determined that the load is low, and the target condensing temperature initial value Tcm0 is changed to the target condensing temperature change value Tcm1. At that time, Tcm1 may be a fixed value, or may be a function of the temperature difference $\Delta T$, but Tcm0>Tcm1. Here, Ta may be an arithmetic mean or may be a weighted mean based on capacity when a plurality of the load side units 300 operate. In addition, for Ta, the load side unit 300 having a maximum temperature difference $\Delta Tc$ among the connected load side units 300 may be selected as a representative one. In any of the cases, Tcm0 becomes Tcm1 (<Tcm0).

At that time, the volume of the outdoor heat exchanger 103 executes control of the opening/closing valve 105b in accordance of the target condensing temperature Tcm. By decreasing the heat transfer area of the outdoor heat exchanger 103, the condensing temperature Tc is kept high, but when the load is low, it is necessary to increase the rotation speed of the fan 106, and thus it is desirable to increase the heat transfer area of the outdoor heat exchanger 103.

Figure 6:
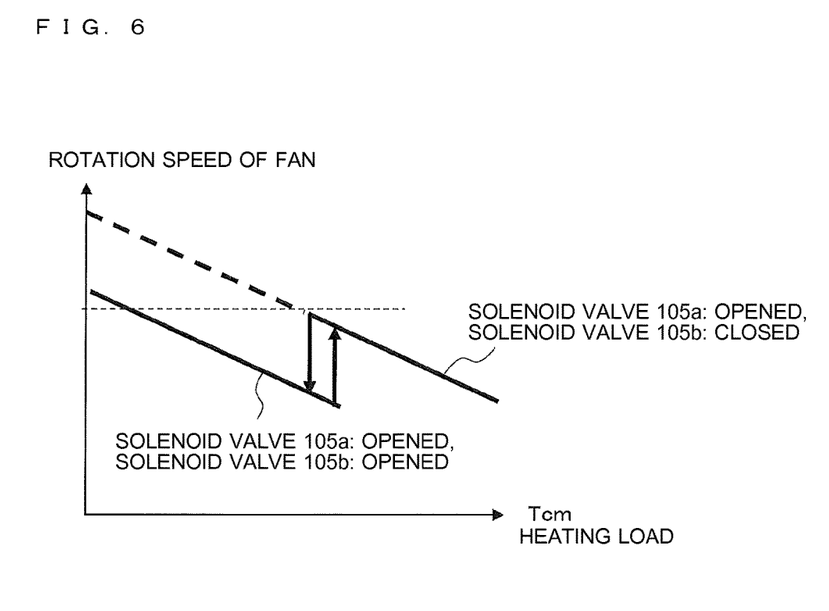
FIG. 6 is an explanatory diagram showing control of a fan of the air-conditioning apparatus according to Embodiment of the present invention.

FIG. 6 is an explanatory diagram showing control of the fan of the air-conditioning apparatus according to Embodiment of the present invention.

For example, as shown in FIG. 6, control is performed as follows. If it is determined that the heating load is high, the opening/closing valve 105b is closed, the heat transfer area of the outdoor heat exchanger 103 is decreased, and the rotation speed of the fan 106 is decreased. If it is determined that the heating load is low, the opening/closing valve 105b is opened, the heat transfer area of the outdoor heat exchanger 103 is increased, and the rotation speed of the fan 106 is decreased.

It should be noted that the opening/closing valve 105a is opened in any of the cases.

By performing control as described above, it is possible to obtain an air-conditioning apparatus 500 having a high energy-saving effect.

REFERENCE SIGNS LIST 100 heat source side unit 101 compressor 102 four-way switching valve 103 outdoor heat exchanger 103a outdoor heat exchanger 103b outdoor heat exchanger 104 accumulator 105 opening/closing valve 105a opening/closing valve 105b opening/closing valve 106 fan 107 check valve 107a check valve 107b check valve 108 check valve 109 check valve 110 check valve 111 check valve 112 check valve 113 check valve 114 check valve 115 check valve 120 first connection pipe 121 second connection pipe 122 third connection pipe 123 fourth connection pipe 124 controller 141 high-pressure sensor 142 low-pressure sensor 200 refrigerant control unit 211 gas-liquid separator 212 first opening/closing valve 212a first opening/closing valve 212b first opening/closing valve 213 second opening/closing valve 213a second opening/closing valve 213b second opening/closing valve 214 first expansion device 215 second expansion device 216 first refrigerant heat exchanger 217 second refrigerant heat exchanger 220 connection pipe 221 connection pipe 300 load side unit 300a load side unit 300b load side unit 311 indoor expansion device 311a indoor expansion device 311b indoor expansion device 312 indoor heat exchanger 312a indoor heat exchanger 312b indoor heat exchanger 313 temperature sensor 313a temperature sensor 313b temperature sensor 314 temperature sensor 314a temperature sensor 314b temperature sensor 315 temperature sensor 315a temperature sensor 315b temperature sensor 300 load side unit 300a load side unit 300b load side unit 401 low-pressure pipe 402 high-pressure pipe 403 connection pipe 404 connection pipe 405 gas pipe 405a gas pipe 405b gas pipe 406 liquid pipe 406a liquid pipe 406b liquid pipe 500 air-conditioning apparatus a meeting portion b meeting portion c meeting portion d meeting portion e meeting portion f meeting portion g meeting portion h meeting portion

The invention claimed is:

1. An air-conditioning apparatus comprising:
a heat source side unit including a compressor, a first heat exchanger, a second heat exchanger, a first valve, a second valve, a fan, and a controller, the first heat exchanger and the second heat exchanger being connected in parallel, the first heat exchanger being connected in series to the first valve, the second heat exchanger being connected in series to the second valve, the heat source side unit being configured to supply heat via refrigerant;
a plurality of load side units each including an indoor heat exchanger and an indoor expansion device connected in series by piping, each of the load side units being supplied with the heat from the heat source side unit via the refrigerant; and
a refrigerant control unit configured to switch a flow of the refrigerant in accordance with an operating state, wherein
the heat source side unit and the refrigerant control unit are connected in series by piping, the refrigerant control unit and each load side unit are connected in series by piping, and the load side units are connected in parallel by piping,
each load side unit performs a cooling operation or a heating operation,
the heat source side unit includes a temperature detector used for obtaining a condensing temperature and an evaporating temperature of the refrigerant,
each load side unit includes a load detector used for obtaining a heating load or a cooling load during the heating operation or the cooling operation, respectively,
the controller changes both a target condensing temperature and a target evaporating temperature of the refrigerant in the outdoor heat exchanger in direct proportion to, or indirect proportion to, the heating load or the cooling load of each load side unit obtained by using the load detector,
the controller controls an operating frequency of the compressor and a rotation speed of the fan such that the condensing temperature obtained by using the temperature detector coincides with the target condensing temperature and the evaporating temperature obtained by using the temperature detector coincides with the target evaporating temperature, and
the controller is configured to
determine whether the plurality of load side units are under a high load or a low load based on each load detector,
open both the first valve and the second valve and decrease a rotational speed of the fan in response to determining that the plurality of load side units are under a low load to increase a volume of refrigerant undergoing heat exchange in the heat source side unit during the low load, and
open the first valve, close the second valve, and decrease a rotational speed of the fan in response to determining that the plurality of load side units are under a high load to decrease the volume of refrigerant undergoing heat exchange through the heat source side unit during the high load.

2. The air-conditioning apparatus of claim 1, wherein
the temperature detector includes:
a high-pressure sensor provided in the heat source side unit and configured to detect a discharge pressure of the refrigerant discharged from the compressor; and
a low-pressure sensor configured to detect a suction pressure of the refrigerant sucked into the compressor,
the temperature detector calculates the condensing temperature from the discharge pressure detected with the high-pressure sensor, and
the temperature detector calculates the evaporating temperature from the suction pressure detected with the low-pressure sensor.

3. The air-conditioning apparatus of claim 2, wherein
in a heating only operation mode in which all the load side units perform a heating operation, and
in a heating main operation mode in which the load side units that perform a heating operation and the load side units that perform a cooling operation are present together and a sum of the respective loads of the load side units that perform the heating operation is higher than a sum of the respective loads of the load side units that perform the cooling operation,
the condensing temperature is calculated from the discharge pressure detected with the high-pressure sensor, and the operating frequency of the compressor is controlled such that the condensing temperature coincides with the target condensing temperature, and
the evaporating temperature is calculated from the suction pressure detected with the low-pressure sensor, and the rotation speed of the fan is controlled such that the evaporating temperature coincides with the target evaporating temperature.

4. The air-conditioning apparatus of claim 3, wherein
the heat source side unit includes a plurality of opening/closing valves and a plurality of the outdoor heat exchangers,
outdoor heat exchanger units in each of which the opening/closing valve and the outdoor heat exchanger are connected in series by piping are connected in parallel by piping, and
in the heating only operation mode and in the heating main operation mode,
the opening/closing valves are controlled in accordance with the target condensing temperature.

5. The air-conditioning apparatus of claim 3, wherein
when the heating load or the cooling load detected by the load side detector is less than a predetermined value in the heating only operation mode and in the heating main operation mode, it is determined that a heating load is low for the load side unit corresponding to the load side detector, and a value of the target condensing temperature is decreased.

6. The air-conditioning apparatus of claim 2, wherein
in a cooling only operation mode in which all the load side units perform a cooling operation, and
in a cooling main operation mode in which the load side units that perform a heating operation and the load side units that perform a cooling operation are present together and a sum of the respective loads of the load side units that perform the cooling operation is higher than a sum of the respective loads of the load side units that perform the heating operation,
the evaporating temperature is calculated from the suction pressure detected with the low-pressure sensor, and the operating frequency of the compressor is controlled such that the evaporating temperature coincides with the target evaporating temperature, and
the condensing temperature is calculated from the discharge pressure detected with the high-pressure sensor, and the rotation speed of the fan is controlled such that the condensing temperature coincides with the target condensing temperature.

7. The air-conditioning apparatus of claim 6, wherein
the heat source side unit includes a plurality of opening/closing valves and a plurality of the outdoor heat exchangers,
outdoor heat exchanger units in each of which the opening/closing valve and the outdoor heat exchanger are connected in series by piping are connected in parallel by piping, and
in the cooling only operation mode and in the cooling main operation mode,
the opening/closing valves are controlled in accordance with the target evaporating temperature.

8. The air-conditioning apparatus of claim 6, wherein
when the heating load or the cooling load of the load side detector is less than a predetermined value in the cooling only operation mode and in the cooling main operation mode, it is determined that a cooling load is low for the load side unit corresponding to the load side detector, and a value of the target evaporating temperature is decreased.

9. The air-conditioning apparatus of claim 2, wherein
the load detector includes a temperature sensor provided in the load side unit and configured to detect a load side suction temperature, and
the load detector detects a load of the load side unit from a difference between the load side suction temperature and a set temperature.

10. The air-conditioning apparatus of claim 9, wherein
in a heating only operation mode in which all the load side units perform a heating operation, and
in a heating main operation mode in which the load side units that perform a heating operation and the load side units that perform a cooling operation are present together and a sum of the respective loads of the load side units that perform the heating operation is higher than a sum of the respective loads of the load side units that perform the cooling operation,
the condensing temperature is calculated from the discharge pressure detected with the high-pressure sensor, and the operating frequency of the compressor is controlled such that the condensing temperature coincides with the target condensing temperature, and
the evaporating temperature is calculated from the suction pressure detected with the low-pressure sensor, and the rotation speed of the fan is controlled such that the evaporating temperature coincides with the target evaporating temperature.

11. The air-conditioning apparatus of claim 10, wherein
the heat source side unit includes a plurality of opening/closing valves and a plurality of the outdoor heat exchangers,
outdoor heat exchanger units in each of which the opening/closing valve and the outdoor heat exchanger are connected in series by piping are connected in parallel by piping, and
in the heating only operation mode and in the heating main operation mode,
the opening/closing valves are controlled in accordance with the target condensing temperature.

12. The air-conditioning apparatus of claim 9, wherein
in a cooling only operation mode in which all the load side units perform a cooling operation, and
in a cooling main operation mode in which the load side units that perform a heating operation and the load side units that perform a cooling operation are present together and a sum of the respective loads of the load side units that perform the cooling operation is higher than a sum of the respective loads of the load side units that perform the heating operation,
the evaporating temperature is calculated from the suction pressure detected with the low-pressure sensor, and the operating frequency of the compressor is controlled such that the evaporating temperature coincides with the target evaporating temperature, and
the condensing temperature is calculated from the discharge pressure detected with the high-pressure sensor, and the rotation speed of the fan is controlled such that the condensing temperature coincides with the target condensing temperature.

13. The air-conditioning apparatus of claim 12, wherein
the heat source side unit includes a plurality of opening/closing valves and a plurality of the outdoor heat exchangers,
outdoor heat exchanger units in each of which the opening/closing valve and the outdoor heat exchanger are connected in series by piping are connected in parallel by piping, and
in the cooling only operation mode and in the cooling main operation mode,
the opening/closing valves are controlled in accordance with the target evaporating temperature.

14. The air-conditioning apparatus of claim 1, wherein
the load detector includes a temperature sensor provided in the load side unit and configured to detect a load side suction temperature, and
the load detector detects a load of the load side unit from a difference between the load side suction temperature and a set temperature.

15. The air-conditioning apparatus of claim 14, wherein
in a heating only operation mode in which all the load side units perform a heating operation, and
in a heating main operation mode in which the load side units that perform a heating operation and the load side units that perform a cooling operation are present together and a sum of the respective loads of the load side units that perform the heating operation is higher than a sum of the respective loads of the load side units that perform the cooling operation,
the condensing temperature is calculated from the discharge pressure detected with the high-pressure sensor, and the operating frequency of the compressor is controlled such that the condensing temperature coincides with the target condensing temperature, and
the evaporating temperature is calculated from the suction pressure detected with the low-pressure sensor, and the rotation speed of the fan is controlled such that the evaporating temperature coincides with the target evaporating temperature.

16. The air-conditioning apparatus of claim 15, wherein
the heat source side unit includes a plurality of opening/closing valves and a plurality of the outdoor heat exchangers,
outdoor heat exchanger units in each of which the opening/closing valve and the outdoor heat exchanger are connected in series by piping are connected in parallel by piping, and
in the heating only operation mode and in the heating main operation mode,
the opening/closing valves are controlled in accordance with the target condensing temperature.

17. The air-conditioning apparatus of claim 14, wherein
in a cooling only operation mode in which all the load side units perform a cooling operation, and
in a cooling main operation mode in which the load side units that perform a heating operation and the load side units that perform a cooling operation are present together and a sum of the respective loads of the load side units that perform the cooling operation is higher than a sum of the respective loads of the load side units that perform the heating operation,
the evaporating temperature is calculated from the suction pressure detected with the low-pressure sensor, and the operating frequency of the compressor is controlled such that the evaporating temperature coincides with the target evaporating temperature, and
the condensing temperature is calculated from the discharge pressure detected with the high-pressure sensor, and the rotation speed of the fan is controlled such that the condensing temperature coincides with the target condensing temperature.

18. The air-conditioning apparatus of claim 17, wherein
the heat source side unit includes a plurality of opening/closing valves and a plurality of the outdoor heat exchangers,
outdoor heat exchanger units in each of which the opening/closing valve and the outdoor heat exchanger are connected in series by piping are connected in parallel by piping, and
in the cooling only operation mode and in the cooling main operation mode,
the opening/closing valves are controlled in accordance with the target evaporating temperature.

* * * * *